UNITED STATES PATENT OFFICE.

RICHARD HERZ, OF FRANKFORT-ON-THE-MAIN, GERMANY, ASSIGNOR TO CASSELLA COLOR COMPANY, OF NEW YORK, N. Y.

BLUE VAT DYE AND PROCESS OF MAKING SAME.

956,348. Specification of Letters Patent. Patented Apr. 26, 1910.

No Drawing. Application filed June 25, 1909. Serial No. 504,340. (Specimens.)

*To all whom it may concern:*

Be it known that I, RICHARD HERZ, doctor of philosophy, a subject of the Kingdom of Prussia, and a resident of Frankfort-on-the-Main, in the Province of Hesse-Nassau and Kingdom of Prussia, Germany, have invented some new and useful Improvements in the Production of Blue Vat Dyestuffs and Processes of Making Same, of which the following is a full description.

In the United States Patent No. 919572 of Louis Haas there are described blue sulfid dyestuffs resulting from the reaction of polysulfids on the products of condensation of p.nitrosophenol with carbazol in the presence of concentrated sulfuric acid. I have now found that according to the conditions applied in their manufacture, different products may be obtained which differ essentially from each other in respect to their solubility in dilute sodium sulfid solution. If, for instance, the raw melt, obtained, as described in the example of the aforesaid United States patent, is heated with a dilute sodium sulfid solution, a great part of the coloring matter goes into solution with a greenish brown color, whereas a certain amount remains undissolved. The dyestuff which is dissolved by the sodium sulfid can be precipitated from the solution by the well-known methods. It shows the properties of the color described in the above-mentioned United States patent. I have further discovered that the part of the melt, being difficultly soluble in dilute sodium sulfid solution, if treated with reducing agents, as commonly used for reducing indigo and other vat colors, such as, for instance, an alkaline solution of sodium hydrosulfite, is dissolved with a pure yellow color, forming a vat. Cotton is dyed from such a vat in full deep blue shades which are distinguished by their excellent fastness to washing, light, and chlorin. If these dyeings are aftertreated on the fiber with weakly oxidizing agents, brighter shades of the same fastness are obtained. I have further discovered that the production of dyestuffs from the products of condensation of paranitrosophenol and carbazol can be carried out in such a manner that the difficultly soluble vat dyestuffs are almost exclusively produced, besides comparatively small amounts of the easily soluble color of United States Patent No. 919,572. In order to obtain this result it is necessary to use in the production of the dyestuffs an alkaline polysulfid containing a high percentage of sulfur, and it is preferable to carry out the process in the presence of a suitable solvent such as ethyl- or methyl-alcohol. It is also preferable to use the products of condensation or their leuco compounds in a pure state.

I have found the following method suitable and effective:—

Example: 160 kilos sodium sulfid crystals and 64 kilos sulfur are heated for a short time to 140–142° C. until the whole sulfur is dissolved and the greater portion of the crystal water of the sodium sulfid is evaporated. To the sodium tetrasulfid thus formed are then added 100 kilos finely ground sulfur, preferably flowers of sulfur, and 400 liters of ethyl alcohol. The mass is then heated for about 2 to 3 hours with the reflux condenser until the highly sulfureted sodium sulfid is formed; then 40 kilos of the dry pure base are added, having probably the following formula:

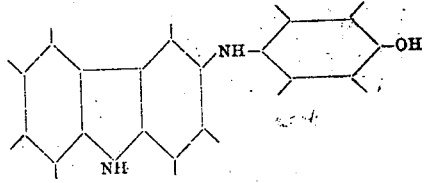

and the whole mass is thereupon boiled for about 48 hours with the reflux condenser while stirring. When the reaction is completed, the alcohol is distilled off, and the residue washed with water and filtered. The product thus obtained is then heated with a solution of sodium sulfid crystals, whereby the superfluous sulfur and the small amount of the easily soluble sulfid dyestuff simultaneously formed are dissolved. It is then filtered again, the undissolved residue representing the pure vat dyestuff. If dried, it is a dark blue powder with a metallic luster. It is almost insoluble in the usual organic solvents, but dissolves with a dark green color in concentrated sulfuric acid, which color changes to a bright greenish blue by diluting the acid with water. It is insoluble in caustic alkalies and but little soluble in dilute alkaline sulfid solutions, by which property it can easily be distinguished from the sulfid dyestuff described in United States Patent No. 919572, and forms, if treated with suitable reducing agents, preferably with alkaline sodium hydrosulfite solutions, a yellowish colored vat, from which cotton is dyed in deep blue shades of excellent fastness.

Having now particularly described and ascertained the nature of my said invention, and in what manner the same is to be performed, I declare that what I claim is:—

1. The manufacture or production of fast blue vat dyestuffs which consists in first condensing p.nitrosophenol with carbazol, heating the product thus obtained with alkaline polysulfids in the usual manner and finally separating the vat color from the soluble dyes by treating the raw melt with a solution of alkaline sulfid substantially as described.

2. The manufacture or production of fast blue vat dyestuffs which consists in first condensing p.nitrosophenol with carbazol, reducing and heating the leuco compound so obtained with alkaline polysulfids in the usual manner and finally separating the vat color from the soluble dyes by treating the raw melt with a solution of alkaline sulfid substantially as described.

3. The manufacture or production of fast blue vat dyestuffs which consists in first condensing p.nitrosophenol with carbazol and heating the product so obtained with an alkaline polysulfid containing a high percentage of sulfur and preferably the presence of a suitable solvent, especially alcohol, substantially as described.

4. The manufacture or production of fast blue vat dyestuffs which consists in first condensing p.nitrosophenol with carbazol, reducing the product and heating the leuco compound so produced with an alkaline polysulfid containing a high percentage of sulfur and preferably in the presence of a suitable solvent, especially alcohol, all substantially as described.

5. As a new article of manufacture the new blue vat dyestuffs derived from the products of condensation of p.nitrosophenol and carbazol or their leuco compounds, being difficultly soluble in a dilute alkaline sulfid solution and representing in a dry state a dark blue powder with a metallic aspect almost insoluble in the usual organic solvents, soluble with a dark green color in concentrated sulfuric acid, soluble with a pure yellow color in warm alkaline hydrosulfite solutions, forming a vat, and dyeing cotton in such vat full deep blue shades fast to washing, light, and chlorin, substantially as described.

In witness whereof I have hereunto signed my name this 11th day of June 1909, in the presence of two subscribing witnesses.

RICHARD HERZ.

Witnesses:
 JEAN GRUND,
 CARL GRUND.